(12) United States Patent
Jacobmeier et al.

(10) Patent No.: US 9,353,234 B2
(45) Date of Patent: *May 31, 2016

(54) RIGID POLYURETHANE FOAMS

(71) Applicant: BASF SE, Ludwigshafen (DE)

(72) Inventors: Olaf Jacobmeier, Luebbecke (DE); Gunnar Kampf, Stemwede-Haldem (DE); Christian Koenig, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/780,508

(22) Filed: Feb. 28, 2013

(65) Prior Publication Data

US 2013/0231410 A1 Sep. 5, 2013

Related U.S. Application Data

(60) Provisional application No. 61/605,219, filed on Mar. 1, 2012.

(51) Int. Cl.
| | | |
|---|---|---|
| *C08J 9/04* | (2006.01) | |
| *C08G 18/48* | (2006.01) | |
| *C08G 18/66* | (2006.01) | |
| *C08G 18/22* | (2006.01) | |
| *C08G 18/32* | (2006.01) | |
| *C08G 101/00* | (2006.01) | |

(52) U.S. Cl.
CPC .............. *C08J 9/04* (2013.01); *C08G 18/225* (2013.01); *C08G 18/3284* (2013.01); *C08G 18/4891* (2013.01); *C08G 18/6688* (2013.01); *C08G 2101/005* (2013.01); *C08G 2101/0025* (2013.01); *C08G 2101/0083* (2013.01)

(58) Field of Classification Search
CPC .............. C08G 18/32; C08G 18/3203; C08G 18/3225; C08G 18/3275; C08G 18/3278; C08G 18/3281; C08G 18/3284; C08G 18/4891; C08G 18/6688; C08G 2101/0025; C08G 2101/005; C08G 2101/0083; C08J 9/04; C08J 2203/10; C08J 2205/10
USPC .......................... 521/164, 167, 172, 173, 174
See application file for complete search history.

(56) References Cited

U.S. PATENT DOCUMENTS

| | | | |
|---|---|---|---|
| 6,495,722 B1 | 12/2002 | Zimmerman et al. | |
| 8,557,887 B2 | 10/2013 | Koesters et al. | |
| 2008/0114086 A1 | 5/2008 | Lorenz et al. | |
| 2011/0201716 A1* | 8/2011 | Gehinger et al. | 521/172 |
| 2011/0218262 A1 | 9/2011 | Eling et al. | |
| 2012/0244303 A1 | 9/2012 | Tomasi et al. | |
| 2012/0264841 A1 | 10/2012 | Tomovic et al. | |
| 2012/0264842 A1 | 10/2012 | Tomovic et al. | |
| 2013/0184369 A1 | 7/2013 | Kampf | |
| 2013/1904193 | 7/2013 | Kampf | |
| 2013/0231413 A1 | 9/2013 | Kunst et al. | |

FOREIGN PATENT DOCUMENTS

| | | | |
|---|---|---|---|
| DE | 196 30 281 A1 | | 1/1998 |
| EP | 0 728 783 A1 | | 8/1996 |
| EP | 0 826 708 A1 | | 3/1998 |
| EP | 1 632 511 A1 | | 3/2006 |
| EP | 1 923 417 A1 | | 5/2008 |
| GB | 1049126 A | | 11/1966 |
| WO | WO 2006/108833 A1 | | 10/2006 |
| WO | WO 2010/043624 | * | 4/2010 |
| WO | WO 2010/106067 A1 | | 9/2010 |

OTHER PUBLICATIONS

U.S. Appl. No. 14/034,745, filed Sep. 24, 2013, Kampf, et al.
U.S. Appl. No. 13/848,427, filed Mar. 21, 2013, Kampf.
International Search Report and Written Opinion issued Jun. 14, 2013 in PCT/EP2013/054099 (with English translation of categories of cited documents).
U.S. Appl. No. 14/176,366, filed Feb. 10, 2014, Jacobmeier, et al.
U.S. Appl. No. 14/210,824, filed Mar. 14, 2014, Jacobmeier, et al.

* cited by examiner

*Primary Examiner* — John Cooney
(74) *Attorney, Agent, or Firm* — Oblon, McClelland, Maier & Neustadt, L.L.P.

(57) ABSTRACT

The invention relates to rigid polyurethane foams obtainable by reaction of

A) organic or modified organic polyisocyanates or mixtures thereof,

B) compounds having two or more isocyanate-reactive hydrogen atoms in the presence of C) optionally further polyester polyols, D) optionally polyetherol polyols, E) optionally flame retardants, F) one or more blowing agents, G) catalysts, and H) optionally further auxiliaries and/or additives, wherein component B) comprises the reaction product of a1) 15 to 40 wt % of one or more polyols or polyamines having an average functionality of 2.5 to 8, a2) 2 to 30 wt % of one or more fatty acids and/or fatty acid monoesters, a3) 35 to 70 wt % of one or more alkylene oxides of 2 to 4 carbon atoms.

19 Claims, No Drawings

RIGID POLYURETHANE FOAMS

The present invention relates to rigid polyurethane foams, to a process for producing them and to a polyol component comprising polyetherester polyols which is useful in their production.

Rigid polyurethane foams are long known and have been extensively described. Rigid polyurethane foams are predominantly used for thermal insulation, for example in district heating pipes, means of transport or buildings and also for producing structural elements, especially sandwich elements.

Composite elements are a significant outlet for rigid polyurethane foams. Composite elements, which are formed particularly of metallic outer layers and a core of isocyanate-based foam, usually polyurethane (PUR) or polyisocyanurate (PIR) foam, are frequently also known as sandwich elements and are currently produced in large volumes on continuous double-belt plant. In addition to sandwich elements for cool-store insulation, elements having colored outer layers are becoming more and more important for decorating exteriors of various buildings. The outer layers used here include sheets of stainless steel, copper or aluminum as well as coated steel.

It is important that the rigid polyurethane foams fill the cavities uniformly and without voids in order that bonding to the outer layers is as good as possible to produce a stable structure that ensures good thermal insulation. To prevent foam defects, the time within which the foamable PU reaction mixture is introduced into the cavity to be insulated has to be short. It is typically low-pressure or preferably high-pressure machines that are usually used to foam out such articles.

A comprehensive overview of the production of rigid polyurethane foams and their use as outer or core layer in composite elements and also their application as insulating layer in cooling or heating technology appears for example in "Polyurethane", Kunststoff-Handbuch, volume 7, 3$^{rd}$ edition, 1993, edited by Dr. Gunter Oertel, Carl-Hanser-Verlag, MunichNienna.

Suitable rigid polyurethane foams are obtainable in known manner by reacting organic polyisocyanates with one or more compounds having two or more reactive hydrogen atoms in the presence of blowing agents, catalysts and optionally auxiliaries and/or additives.

The compounds used in the production of polyurethanes as having two or more isocyanate-reactive hydrogen atoms are preferably polyether alcohols and/or polyester alcohols. Polyols are selected with particular regard to costs and the desired performance characteristics (e.g., EP-A 1 632 511, U.S. Pat. No. 6,495,722, WO 2006/108833).

However, the surface properties of known rigid polyurethane foams continue to be in need of improvement, especially with regard to the production of composite elements, since they have a significant influence on the adherence of outer layers to the foam. A good surface is also very important in the production of foams by the sprayed foam process.

The printed publications EP 0 728 783 A1, EP 0 826 708 A1 and WO 2010/106067 A1 describe processes for producing rigid PU foams where the polyol component comprises castor oil. Castor oil can be advantageous for the surface properties of the foam. On the other hand, castor oil in the presence of water may lead to phase separation and hence to instability on the part of the polyol component and this may lead to processing problems. Water is frequently used as an inexpensive and environmentally friendly blowing agent in the polyol component. One disadvantage of the process described in EP 0 826 708 A1 is the very poor adherence of the rigid PU foams formed as well as the high viscosity of the polyol component.

Similarly, the rigid PU foams produced by the process described in EP 0 728 783 A1 are still in need of improvement with regard to their surface properties and adherence. The rigid PU foams produced according to WO 2010/106067 A1 do exhibit good adherence and good surface constitution, but are still in need of improvement in respect of the polyol component's storage stability in the presence of comparatively large amounts of water (>1.5 parts by weight).

It is an object of the present invention to provide a polyol component for producing rigid polyurethane foams which has a high solubility for physical blowing agents, is phase stable even under changes in composition and also has a low viscosity and good processing properties, especially good curing.

We have found that this object is achieved by rigid polyurethane foams obtainable by reaction of
  A) organic or modified organic polyisocyanates or mixtures thereof,
  B) compounds having two or more isocyanate-reactive hydrogen atoms in the presence of
  C) optionally further polyester polyols,
  D) optionally polyetherol polyols,
  E) optionally flame retardants,
  F) one or more blowing agents,
  G) catalysts, and
  H) optionally further auxiliaries and/or additives,
  wherein component B) comprises the reaction product of
  a1) 15 to 40 wt % of one or more polyols or polyamines having an average functionality of 2.5 to 8,
  a2) 2 to 30 wt % of one or more fatty acids and/or fatty acid monoesters,
  a3) 35 to 70 wt % of one or more alkylene oxides of 2 to 4 carbon atoms.

The average functionality of the polyols, polyamines or mixtures of polyols and/or polyamines is preferably in the range from 3 to 6 and more preferably in the range from 3.5 to 5.5.

Preferred polyols or polyamines of component a1) are selected from the group consisting of sugars (sorbitol, glucose, sucrose), pentaerythritol, sorbitol, trimethylolpropane, glycerol, tolylenediamine, ethylenediamine, ethylene glycols, propylene glycol and water. Particular preference is given to sugars (sorbitol, glucose, sucrose), glycerol, water and ethylene glycols and also mixtures thereof, especial preference being given to mixtures comprising two or more compounds selected from sucrose, glycerol, water and diethylene glycol.

In one specific embodiment, component a1) comprises a mixture of glycerol and sucrose.

The proportion of the polyetherester polyols of the present invention which is contributed by polyols and/or polyamines a1) is generally in the range from 15 to 40 wt %, preferably in the range from 20 to 35 wt % and more preferably in the range from 25 to 30 wt %, based on the weight of polyetherester polyols.

In general, the fatty acid or fatty acid monoester a2) is selected from the group consisting of polyhydroxy fatty acids, ricinoleic acid, hydroxyl-modified oils, hydroxyl-modified fatty acids and fatty acid esters based on myristoleic acid, palmitoleic acid, oleic acid, vaccenic acid, petroselic acid, gadoleic acid, erucic acid, nervonic acid, linoleic acid, α- and γ-linolenic acid, stearidonic acid, arachidonic acid, timnodonic acid, clupanodonic acid and cervonic acid. Methyl esters are preferred fatty acid monoesters.

In one preferred embodiment of the invention, the fatty acids or fatty acid monoesters a2) are used in the form of fatty acid methyl esters, biodiesel or pure fatty acids. Particular preference is given to biodiesel and pure fatty acids and specific preference to pure fatty acids, preferably oleic acid and stearic acid, especially oleic acid.

In a further preferred embodiment of the present invention, the fatty acid or fatty acid monoester a2) is oleic acid or stearic acid or a derivative of these fatty acids, particular preference being given to oleic acid, methyl oleate, stearic acid and methyl stearate. The fatty acid or fatty acid monoester is generally used to improve blowing agent solubility in the production of polyurethane foams. In a particularly preferred embodiment of the invention component a2) contains methyl oleate, especially preferred component a2) consists thereof.

The fatty acid proportion of polyetherester polyols according to the present invention is generally in the range from 2 to 30 wt %, preferably in the range from 5 to 25 wt %, more preferably in the range from 8 to 20 wt % and especially in the range from 12 to 17 wt %, based on the weight of polyetherester polyols.

Useful alkylene oxides a3) have 2 to 4 carbon atoms and include for example tetrahydrofuran, 1,3-propylene oxide, 1,2-butylene oxide, 2,3-butylene oxide, styrene oxide and preferably ethylene oxide and 1,2-propylene oxide. The alkylene oxides can be used individually, alternatingly in succession or as mixtures. Propylene oxide and ethylene oxide are preferred alkylene oxides, mixtures of ethylene oxide and propylene oxide with >35 wt % of propylene oxide are particularly preferred, and pure propylene oxide is especially preferred.

One preferred embodiment utilizes an alkoxylation catalyst comprising an amine, preferably dimethylethanolamine or imidazole and more preferably imidazole.

The proportion of the polyetherester polyols of the present invention which is contributed by alkylene oxides is generally in the range from 35 to 70 wt %, preferably in the range from 50 to 65 wt % and more preferably in the range from 55 to 60 wt %.

The OH number of the polyetherester polyols of the present invention is in the range from 200 to 700 mg KOH/g, preferably in the range from 300 to 600 mg KOH/g, more preferably in the range from 350 to 500 mg KOH/g and especially in the range from 400 to 500 mg KOH/g.

The average functionality of the polyetherester polyols of the present invention is generally in the range from 2.5 to 8, preferably in the range from 3 to 6, more preferably in the range from 3.5 to 5.5 and especially in the range from 4 to 5.

The viscosity of the polyetherester polyols of the present invention is generally <10 000 mPas, preferably <7000 mPas, more preferably <5500 mPas and specifically <4000 mPas, all measured at 25° C. to DIN 53018.

The invention further provides a process for producing rigid polyurethane foams by reaction of
A) organic or modified organic polyisocyanates or mixtures thereof,
B) one or more of the above-described polyetherester polyols,
C) optionally further polyester polyols,
D) optionally polyetherol polyols,
E) optionally flame retardants,
F) one or more blowing agents,
G) catalysts, and
H) optionally further auxiliaries and/or additives.

The present invention also provides a polyol mixture comprising said components B) to F) and H), i.e.
B) one or more of the above-described polyetherester polyols,
C) optionally further polyester polyols,
D) optionally polyether polyols,
E) optionally flame retardants,
F) one or more blowing agents,
G) optionally catalysts, and
H) optionally further auxiliaries and/or additives.

Further subjects of the present invention include rigid polyurethane foams and rigid polyisocyanurate foams obtainable via the process of the present invention and also the use of the polyetherester polyols of the present invention for producing rigid polyurethane foams or rigid polyisocyanurate foams.

The proportion of polyetherester polyols B) of the present invention is generally >20 wt %, preferably >40 wt %, more preferably >60 wt % and especially preferably >70 wt %, based on total components B) to H).

Production of rigid polyurethane foams by the process of the present invention, in addition to the specific polyetherester polyols described above, utilizes the constructal components known per se, which will now be detailed.

Possible organic or modified organic polyisocyanates A) are the aliphatic, cycloaliphatic, araliphatic and preferably aromatic polyfunctional isocyanates known per se.

Specific examples are: alkylene diisocyanates having from 4 to 12 carbon atoms in the alkylene radical, e.g. dodecane 1,12-diisocyanate, 2-ethyltetramethylene 1,4-diisocyanate, 2-methylpentamethylene 1,5-diisocyanate, tetramethylene 1,4-diisocyanate, and preferably hexamethylene 1,6-diisocyanate; cycloaliphatic diisocyanates such as cyclohexane 1,3- and 1,4-diisocyanate and also any mixtures of these isomers, 1-isocyanato-3,3,5-trimethyl-5-isocyanatomethylcyclohexane (IPDI), hexahydrotolylene 2,4- and 2,6-diisocyanate and also the corresponding isomer mixtures, dicyclohexylmethane 4,4'-, 2,2'- and 2,4'-diisocyanate and also the corresponding isomer mixtures, and preferably aromatic diisocyanates and polyisocyanates such as tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,2'-diisocyanates, polyphenylpolymethylene polyisocyanates, mixtures of diphenylmethane 4,4'-, 2,4'- and 2,2'-diisocyanates and polyphenylpolymethylene polyisocyanates (crude MDI) and mixtures of crude MDI and tolylene diisocyanates. The organic diisocyanates and polyisocyanates can be used individually or in the form of their mixtures.

Preferred polyisocyanates are tolylene diisocyanate (TDI), diphenylmethane diisocyanate (MDI) and in particular mixtures of diphenylmethane diisocyanate and polyphenylenepolymethylene polyisocyanates (polymeric MDI or PMDI).

Use is frequently also made of modified polyfunctional isocyanates, i.e. products which are obtained by chemical reaction of organic polyisocyanates. Examples which may be mentioned are polyisocyanates comprising ester, urea, biuret, allophanate, carbodiimide, isocyanurate, uretdione, carbamate and/or urethane groups.

Very particular preference is given to using polymeric MDI for producing the rigid polyurethane foams of the invention.

Suitable further polyester polyols C) can be prepared, for example, from organic dicarboxylic acids having from 2 to 12 carbon atoms, preferably aromatic or mixtures of aromatic and aliphatic dicarboxylic acids, and polyhydric alcohols, preferably diols, having from 2 to 12 carbon atoms, preferably from 2 to 6 carbon atoms. Possible dicarboxylic acids are, for example: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used either individually or in admixture with one another. It is also possible to use the corresponding dicarboxylic acid derivatives, e.g. dicarboxylic esters of alcohols having from 1 to 4 carbon atoms or dicarboxylic anhydrides, in place of the free dicarboxylic acids. As aromatic dicarboxylic acids, preference is given to using phthalic acid, phthalic anhydride, terephthalic acid and/or isophthalic acid as a mixture or alone. As aliphatic dicarboxylic acids, preference is given to using dicarboxylic acid mixtures of succinic, glutaric and adipic acid in weight ratios of, for example, 20-35:35-50:20-32, and in particular adipic acid. Examples of dihydric and polyhydric alcohols, in particular diols, are: ethanediol, diethylene glycol, 1,2- or 1,3-propanediol, dipropylene glycol, 1,4-butanediol, 1,5-pentanediol, 1,6-hexanediol, 1,10-decanediol, glycerol, trimethylolpropane and pentaerythritol. Preference is given to using ethanediol, diethylene glycol, 1,4-butanediol, 1,5-pentanediol, 1,6-hexanediol or mixtures of at least two of the diols mentioned, in particular mixtures of 1,4-butanediol, 1,5-pentane-diol and 1,6-hexanediol. It is also possible to use polyester polyols derived from lactones, e.g. ε-caprolactone, or hydroxycarboxylic acids, e.g. ω-hydroxycaproic acid.

To prepare the further polyester polyols C), bio-based starting materials and/or derivatives thereof are also suitable, for example castor oil, polyhydroxy fatty acids, ricinoleic acid, hydroxyl-modified oils, grapeseed oil, black cumin oil, pumpkin kernel oil, borage seed oil, soybean oil, wheat germ oil, rapeseed oil, sunflower oil, peanut oil, apricot kernel oil, pistachio oil, almond oil, olive oil, macadamia nut oil, avocado oil, sea buckthorn oil, sesame oil, hemp oil, hazelnut oil, primula oil, wild rose oil, safflower oil, walnut oil, hydroxyl-modified fatty acids and fatty acid esters based on myristoleic acid, palmitoleic acid, oleic acid, vaccenic acid, petroselic acid, gadoleic acid, erucic acid, nervonic acid, linoleic acid, α- and γ-linolenic acid, stearidonic acid, arachidonic acid, timnodonic acid, clupanodonic acid and cervonic acid.

The level of further polyester polyols C) is generally in the range from 0 to 20 wt %, based on total components B) to H). One embodiment of the invention utilizes from 1 to 10 wt % of polyester polyols C). One preferred embodiment of the invention utilizes no further polyester polyols C).

It is also possible to make concomitant use of polyether polyols D) which are prepared by known methods, for example from one or more alkylene oxides having from 2 to 4 carbon atoms in the alkylene radical by anionic polymerization using alkali metal hydroxides, e.g. sodium or potassium hydroxide, or alkali metal alkoxides, e.g. sodium methoxide, sodium or potassium ethoxide or potassium isopropoxide, as catalysts with addition of at least one starter molecule comprising from 2 to 8, preferably from 2 to 6, reactive hydrogen atoms, or by cationic polymerization using Lewis acids, e.g. antimony pentachloride, boron fluoride etherate, or bleaching earth, as catalysts.

Suitable alkylene oxides are, for example, tetrahydrofuran, 1,3-propylene oxide, 1,2- or 2,3-butylene oxide, styrene oxide and preferably ethylene oxide and 1,2-propylene oxide. The alkylene oxides can be used individually, alternately in succession or as mixtures. Preferred alkylene oxides are propylene oxide and ethylene oxide, with particular preference being given to propylene oxide.

Possible starter molecules are, for example: water, organic dicarboxylic acids, such as succinic acid, adipic acid, phthalic acid and terephthalic acid, aliphatic and aromatic, optionally N-monoalkyl-, N,N-dialkyl- and N,N'-dialkyl-substituted diamines having from 1 to 4 carbon atoms in the alkyl radical, e.g. optionally monoalkyl- and dialkyl-substituted ethylenediamine, diethylenetriamine, triethylenetetramine, 1,3-propylenediamine, 1,3- or 1,4-butylenediamine, 1,2-, 1,3-, 1,4-, 1,5- and 1,6-hexa-methylenediamine, phenylenediamines, 2,3-, 2,4- and 2,6-tolylenediamine and 4,4'-2,4'- and 2,2'-diaminodiphenylmethane.

Further possible starter molecules are: alkanolamines such as ethanolamine, N-methylethanolamine and N-ethylethanolamine, dialkanolamines, such as diethanolamine, N-methyldiethanolamine and N-ethyldiethanolamine, and trialkanolamines, such as triethanolamine, and ammonia.

Preference is given to using dihydric or polyhydric alcohols such as ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose. Particular preference is given to the recited diprimary amines, for example ethylenediamine.

The polyether polyols D), preferably polyoxypropylene polyols and/or polyoxyethylene polyols, have a functionality of preferably from 2 to 6 and in particular from 2 to 5 and number average molecular weights of from 150 to 3000, preferably from 200 to 2000 and in particular from 250 to 1000.

One embodiment of the invention utilizes an alkoxylated amine, preferably a propoxylated amine, for example propoxylated ethylenediamine, as polyether polyol D), generally in amounts from 0 to 35 wt %, preferably in amounts from 0 to 10 wt %, based on total components B) to H). One embodiment utilizes a propoxylated amine in amounts from 2 to 6 wt %. One particularly preferred embodiment utilizes no alkoxylated amine.

One advantage of the invention is that a polyether polyol D) and especially a propoxylated amine can also be omitted.

A further particularly preferred embodiment of the invention utilizes an alkoxylated polyol, preferably a propoxylated polyol, based on a mixture of glycerol and sucrose or diethylene glycol and sucrose as polyether polyol D), preferably in amounts from 0 to 35 wt %, preferably from 0 to 20 wt %, more preferably from 0 to 10 wt %, based on the total components B) to H).

The proportion of polyether polyols D) is generally in the range from 0 to 40 wt %, preferably in the range from 0 to 20 wt % and more preferably in the range from 0 to 10 wt %, based on total components B) to F).

As flame retardants E), it is generally possible to use the flame retardants known from the prior art. Suitable flame retardants are, for example, nonincorporable brominated substances, brominated esters, brominated ethers (Ixol) or brominated alcohols such as dibromoneopentyl alcohol, tribromoneopentyl alcohol and PHT-4-diol and also chlorinated phosphates such as tris(2-chloroethyl) phosphate, tris(2-chloropropyl) phosphate (TCPP), tris(1,3-dichloropropyl) phosphate, tricresyl phosphate, tris(2,3-dibromopropyl) phosphate, tetrakis(2-chloroethyl) ethylenediphosphate, dimethyl methanephosphonate, diethyl diethanolaminomethylphosphonate and also commercial halogen-comprising flame retardant polyols. It is possible to use phosphates or phosphonates such as diethyl ethanephosphonate (DEEP), triethyl phosphate (TEP), dimethyl propylphosphonate (DMPP), diphenyl cresyl phosphate (DPK) and others as further liquid flame retardants.

Apart from the abovementioned flame retardants, it is possible to use inorganic or organic flame retardants such as red phosphorus, preparations comprising red phosphorus, aluminum oxide hydrate, antimony trioxide, arsenic oxide, ammonium polyphosphate and calcium sulfate, expandable graphite or cyanuric acid derivatives such as melamine, or mixtures of at least two flame retardants, e.g. ammonium polyphosphates and melamine and optionally maize starch or ammonium polyphosphate, melamine, expandable graphite and optionally aromatic polyesters for making the rigid polyurethane foams flame resistant.

Preferable flame retardants are the recited phosphorus-containing flame retardants, particular preference being given to dimethyl propylphosphonate (DMPP), diethyl ethanephosphonate (DEEP), triethyl phosphate (TEP), diphenyl cresyl phosphate (DPK), triphenyl phosphate (TPP) and tris-(2-chloropropyl) phosphate (TCPP), with special preference being given to TCPP.

The proportion of flame retardant E) is generally in the range from 0 to 30 wt %, preferably in the range from 0 to 15 wt %, more preferably in the range from 0 to 10 wt %, even more preferably in the range from 0 to 5 wt % and specifically 0 wt %, based on components B) to H).

Blowing agents F) which are used for producing the rigid polyurethane foams include preferably water, formic acid and mixtures thereof. These react with isocyanate groups to form carbon dioxide and in the case of formic acid carbon dioxide and carbon monoxide. In addition, physical blowing agents such as low-boiling hydrocarbons can be used. Suitable physical blowing agents are liquids which are inert towards the organic, optionally modified polyisocyanates and have boiling points below 100° C., preferably below 50° C., at atmospheric pressure, so that they vaporize under the conditions of the exothermic polyaddition reaction. Examples of such liquids which can preferably be used are alkanes such as heptane, hexane, n-pentane and isopentane, preferably industrial mixtures of n-pentane and isopentane, n-butane and isobutane and propane, cycloalkanes such as cyclopentane and/or cyclohexane, ethers such as furan, dimethyl ether and diethyl ether, ketones such as acetone and methyl ethyl ketone, alkyl carboxylates such as methyl formate, dimethyl oxalate and ethyl acetate and halogenated hydrocarbons such as methylene chloride, dichloromono-fluoromethane, difluoromethane, trifluoromethane, difluoroethane, tetrafluoroethane, chlorodifluoroethanes, 1,1-dichloro-2,2,2-trifluoroethane, 2,2-dichloro-2-fluoroethane and heptafluoropropane. Mixtures of these low-boiling liquids with one another and/or with other substituted or unsubstituted hydrocarbons can also be used. Organic carboxylic acids such as formic acid, acetic acid, oxalic acid, ricinoleic acid and carboxyl-containing compounds are also suitable.

It is preferable not to use any halogenated hydrocarbons as blowing agent. It is preferable to use water, any pentane isomer and also mixtures of water and pentane isomers and also formic acid.

The blowing agents are either wholly or partly dissolved in the polyol component (i.e. B+C+D+E+F+G+H) or are introduced via a static mixer immediately before foaming of the polyol component. It is usual for water or formic acid to be fully or partially dissolved in the polyol component and the physical blowing agent (for example pentane) and any remainder of the chemical blowing agent to be introduced "on-line".

The polyol component is admixed in situ with pentane, possibly some of the chemical blowing agent and also with all or some of the catalysts. Auxiliaries and additives as well as flame retardants are—if present—already comprised in the polyol blend.

The amount of blowing agent or blowing agent mixture used is in the range from 1 to 40 wt %, preferably in the range from 1 to 25 wt % and more preferably in the range from 1.5 to 17.5 wt %, all based on total components B) to H).

When water is used as blowing agent, it is preferably added to the component B) in an amount of 0.2 to 5 wt %, based on component B). The addition of water can take place in combination with the use of other blowing agents described. Preference is given to using water combined with pentane.

Catalysts G) used for preparing the rigid polyurethane foams are particularly compounds which substantially speed the reaction of the component B) to F) compounds comprising reactive hydrogen atoms, especially hydroxyl groups, with the organic, optionally modified polyisocyanates A).

It is advantageous to use basic polyurethane catalysts, for example tertiary amines such as triethylamine, tributylamine, dimethylbenzylamine, dicyclohexylmethylamine, dimethylcyclohexylamine, N,N,N',N'-tetramethyldiaminodiethyl ether, bis(dimethyl-aminopropyl)urea, N-methylmorpholine or N-ethylmorpholine, N-cyclohexylmorpholine, N,N,N',N'-tetramethylethylenediamine, N,N,N, N-tetramethylbutanediamine, N,N,N,N-tetramethylhexane-1,6-diamine, pentamethyldiethylenetriamine, dimethylpiperazine, N-dimethylaminoethylpiperidine, 1,2-dimethylimidazole, 1-azabicyclo-[2.2.0]octane, 1,4-diazabicyclo[2.2.2]octane (Dabco) and alkanolamine compounds, such as triethanolamine, triisopropanolamine, N-methyldiethanolamine and N-ethyldiethanolamine, dimethylaminoethanol, 2-(N,N-dimethylaminoethoxy)ethanol, N,N',N''-tris(dialkylaminoalkyl)hexahydrotriazines, e.g. N,N',N''-tris(dimethylaminopropyl)-hexahydrotriazine, and triethylenediamine. However, metal salts such as iron(II) chloride, zinc chloride, lead octoate and preferably tin salts such as tin dioctoate, tin diethylhexoate and dibutyltin dilaurate and also, in particular, mixtures of tertiary amines and organic tin salts are also suitable.

Further possible catalysts are: amidines such as 2,3-dimethyl-3,4,5,6-tetra-hydropyrimidine, tetraalkylammonium hydroxides such as tetramethylammonium hydroxide, alkali metal hydroxides such as sodium hydroxide and alkali metal alkoxides such as sodium methoxide and potassium isopropoxide, and also alkali metal salts of long-chain fatty acids having from 10 to 20 carbon atoms and optionally lateral OH groups. Preference is given to using from 0.001 to 6% by weight, in particular from 0.05 to 3% by weight, of catalyst or catalyst combination, based on the weight of the components B) to H). It is also possible to allow the reactions to proceed without catalysis. In this case, the catalytic activity of amine-initiated polyols is exploited.

When, during foaming, a relatively large polyisocyanate excess is used, further suitable catalysts for the trimerization reaction of the excess NCO groups with one another are: catalysts which form isocyanurate groups, for example ammonium ion salts or alkali metal salts, either alone or in combination with tertiary amines. Isocyanurate formation leads to flame-resistant PIR foams which are preferably used in industrial rigid foam, for example in building and construction as insulation boards or sandwich elements.

Further information regarding the abovementioned and further starting materials may be found in the technical literature, for example Kunststoffhandbuch, Volume VII, Polyurethane, Carl Hanser Verlag Munich, Vienna, 1st, 2nd and 3rd Editions 1966, 1983 and 1993.

Further auxiliaries and/or additives H) can optionally be added to the reaction mixture for producing the rigid polyurethane foams. Mention may be made of, for example, surface-active substances, foam stabilizers, cell regulators, fillers, dyes, pigments, flame retardants, hydrolysis inhibitors, fungistatic and bacteriostatic substances.

Possible surface-active substances are, for example, compounds which serve to aid homogenization of the starting materials and may also be suitable for regulating the cell structure of the polymers. Mention may be made of, for example, emulsifiers such as the sodium salts of castor oil sulfates or of fatty acids and also salts of fatty acids with amines, e.g. diethylamine oleate, diethanolamine stearate, diethanolamine ricinoleate, salts of sulfonic acids, e.g. alkali metal or ammonium salts of dodecylbenzenesulfonic or dinaphthylmethanedisulfonic acid and ricinoleic acid; foam stabilizers such as siloxane-oxyalkylene copolymers and other organopolysiloxanes, ethoxylated alkylphenols, ethoxylated fatty alcohols, paraffin oils, castor oil esters or ricinoleic esters, Turkey red oil and peanut oil, and cell regulators such as paraffins, fatty alcohols and dimethylpolysiloxanes. The above-described oligomeric acrylates having polyoxyalkylene and fluoroalkane radicals as side groups are also suitable for improving the emulsifying action, the cell structure and/or for stabilizing the foam. The surface-active substances are usually employed in amounts of from 0.01 to 10 wt %, and preferably from 0.01 to 5 wt % based on the weight of components B) to H).

Fillers, in particular reinforcing fillers, are to be understood as meaning the customary organic and inorganic fillers, reinforcing materials, weighting agents, agents for improving the abrasion behavior in paints, coating compositions, etc., which are known per se. Specific examples are: inorganic fillers such as siliceous minerals, for example sheet silicates such as antigorite, serpentine, hornblendes, amphiboles, chrisotile and talc, metal oxides such as kaolin, aluminum oxides, titanium oxides and iron oxides, metal salts, such as chalk, barite and inorganic pigments such as cadmium sulfide and zinc sulfide and also glass, etc. Preference is given to using kaolin (china clay), aluminum silicate and coprecipitates of barium sulfate and aluminum silicate and also natural and synthetic fibrous minerals such as wollastonite, metal fibers and in particular glass fibers of various length, which may be coated with a size. Possible organic fillers are, for example: carbon, melamine, rosin, cyclopentadienyl resins and graft polymers and also cellulose fibers, polyamide, polyacrylonitrile, polyurethane, polyester fibers based on aromatic and/or aliphatic dicarboxylic esters and in particular carbon fibers.

The inorganic and organic fillers can be used individually or as mixtures and are added to the reaction mixture in amounts of from 0.5 to 50 wt %, preferably from 1 to 40 wt %, based on the weight of the components A) to H), although the content of mats, nonwovens and woven fabrics of natural and synthetic fibers can reach values of up to 80 wt %.

Further information regarding the abovementioned other customary auxiliaries and additives may be found in the technical literature, for example the monograph by J. H. Saunders and K. C. Frisch "High Polymers" Volume XVI, Polyurethanes, Parts 1 and 2, Interscience Publishers 1962 and 1964, or Kunststoff-Handbuch, Polyurethane, Volume VII, Hanser-Verlag, Munich, Vienna, 1st and 2nd Editions, 1966 and 1983.

To produce the rigid polyurethane foams of the present invention, the optionally modified organic polyisocyanates A), the specific polyetherester polyols B) of the present invention, optionally the further polyester polyols C) and optionally the polyetherols and/or further compounds having two or more isocyanate-reactive groups D) are reacted in such amounts that the equivalence ratio of NCO groups of the polyisocyanates A) to the sum of the reactive hydrogen atoms of the components B), optionally C), optionally D) and also E) and F) is in the range from 1 to 6:1, preferably in the range from 1.1 to 5:1 and more particularly in the range from 1.2 to 3.5:1.

In one preferred embodiment, the polyol component comprises
25 to 90 wt % of polyetherester polyols B),
0 to 20 wt % of further polyester polyols C),
0 to 35 wt % of polyether polyols D),
0 to 30 wt % of flame retardants E),
1 to 40 wt % of blowing agents F),
0.01 to 5 wt % of catalysts G),
0.01 to 10 wt % of auxiliaries and/or additives H).

It is more preferable for the polyol component to comprise
50 to 85 wt % of polyetherester polyols B),
0 to 10 wt %, especially 0 wt % of further polyester polyols C),
0 to 10 wt %, especially 0 wt % of polyether polyols D),
0 to 15 wt % of flame retardants E),
1 to 30 wt % of blowing agents F),
0.05 to 3 wt % of catalysts G),
0.01 to 5 wt % of auxiliaries and/or additives H).

The rigid polyurethane foams are advantageously produced by the one shot process, for example using the high pressure or low pressure technique in open or closed molds, for example metallic molds. It is also customary to apply the reaction mixture in a continuous manner to suitable belt lines to produce panels.

The starting components are, at a temperature from 15 to 90° C., preferably from 20 to 60° C. and especially from 20 to 35° C., mixed and introduced into an open mold or, if necessary under superatmospheric pressure, into a closed mold, or applied in a continuous workstation to a belt for receiving the reactive material. Mixing, as already noted, can be carried out mechanically using a stirrer or a stirring screw. Mold temperature is advantageously in the range from 20 to 110° C., preferably in the range from 30 to 70° C. and especially in the range from 40 to 60° C.

The rigid polyurethane foams produced by the process of the present invention have a density of 15 to 300 g/l, preferably of 20 to 100 g/l and especially of 25 to 60 g/l.

EXAMPLES

Inventive Example 1

Producing a Polyetherester Polyol with Oleic Acid 250.1 g of glycerol, 2.5 g of imidazole, 1139.7 g of sucrose as well as 750.6 g of oleic acid were initially charged to a 5 L reactor at 25° C. The reactor was then inertized with nitrogen. The kettle was heated to 130° C. and 2858.1 g of propylene oxide were metered in. Following a reaction time of 4 h, the kettle was fully evacuated at 100° C. for 60 minutes and then cooled down to 25° C. to obtain 4945 g of product.

The polyetherester polyol obtained had the following characteristic values:
OH number: 416.3 mg KOH/g
Viscosity (25° C.): 7210 mPas
Acid number: 0.08 mg KOH/g
Water content: 0.016%

Inventive Example 2

Producing a Polyetherester Polyol with Methyl Oleate 995.2 g of glycerol, 2.5 g of imidazole, 422.8 g of sucrose as well as 676.1 g of methyl oleate were initially charged to a 5 L reactor at 25° C. The reactor was then inertized with nitrogen. The kettle was heated to 130° C. and 2903.4 g of propylene oxide were metered in. Following a reaction time of 3 h, the kettle was fully evacuated at 100° C. for 60 minutes and then cooled down to 25° C. to obtain 4904.1 g of product.

The polyetherester polyol obtained had the following characteristic values:

OH number: 464.5 mg KOH/g
Viscosity (25° C.): 783 mPas
Acid number: 0.11 mg KOH/g
Water content: 0.02%

Comparative Example 1

Starting from
55.65 parts by weight of a polyether alcohol 1 having a hydroxyl number of 490 mg
KOH/g, based on propylene oxide and a mixture of sugar and glycerol as starter,
6 parts by weight of a polyether alcohol 2 having a hydroxyl number of 750 mg KOH/g, based on propylene oxide and ethylenediamine as starter,
20 parts by weight of castor oil,
15 parts by weight of tris-2-chloroisopropyl phosphate (TCPP),
2 parts by weight of silicone foam stabilizer (Tegostab® B 8443 from Goldschmidt),
0.5 part by weight of a 50 wt % solution of potassium acetate in ethylene glycol, and
0.85 part by weight of water
a polyol component was produced by mixing.
The polyol component is stable at 20° C. It was reacted with a polymeric MDI having an NCO content of 31.5 wt % (Lupranat® M50 from BASF SE) in the presence of n-pentane (7.5 parts by weight), dimethylcyclohexylamine and water at an isocyanate index of 129. The amounts of dimethylcyclohexylamine and water were chosen such that the fiber time was 53 seconds and the resulting foam had a density of 38 kg/m$^3$.

Comparative Example 2

Compared with the polyol component of comparative example 1 the amounts of polyether alcohol 1 and water used were changed as follows:
54.0 parts by weight of polyether alcohol 1, and
2.5 parts by weight of water.
A polyol component was produced by mixing. The polyol component was not stable at T=20° C., separating into two phases.

Comparative Example 3

Compared with the polyol component of comparative example 1 the amounts of polyether alcohol 1 and tris-2-chloroisopropyl phosphate used were changed as follows:
60.65 parts by weight of polyether alcohol 1, and
10 parts by weight of tris-2-chloroisopropyl phosphate.
A polyol component was produced by mixing. The polyol component was not stable at
T=20° C., separating into two phases.

Comparative Example 4

The amounts of polyether alcohol 1 and polyether alcohol 2 used in the polyol component of comparative example 1 were changed as follows:
60.65 parts by weight of polyether alcohol 1, and
0 part by weight of polyether alcohol 2.
A polyol component was produced by mixing. The polyol component was not stable at T=20° C., separating into two phases.

Comparative Example 5

Starting from 56.15 parts by weight of a polyether alcohol 1,
6 parts by weight of polyether alcohol 2,
20 parts by weight of a polyether alcohol 3 having a hydroxyl number of 400 mg KOH/g based on propylene oxide and glycerol as starter,
15 parts by weight of tris-2-chloroisopropyl phosphate,
1.8 parts by weight of silicone foam stabilizer (Tegostab® B 8443 from Goldschmidt),
0.2 part by weight of a 50% solution of potassium acetate in ethylene glycol, and
0.85 part by weight of water
a polyol component was produced by mixing.
The polyol component was stable at 20° C. It was reacted with a polymeric MDI having an NCO content of 31.5 wt % (Lupranat® M50 from BASF SE) in the presence of n-pentane (7.5 parts by weight), dimethylcyclohexylamine and water at an isocyanate index of 116. The amounts of dimethylcyclohexylamine and water were chosen such that the fiber time was 53 seconds and the resulting foam had a density of 38 kg/m$^3$.

Comparative Example 6

Compared with the polyol component of comparative example 5 the amounts of polyether alcohol 1 and water used were changed as follows:
54.5 parts by weight of polyether alcohol 1, and 2.5 parts by weight of water.
A polyol component was produced by mixing. The polyol component is clear at T=20° C. It was reacted with a polymeric MDI having an NCO content of 31.5 wt % (Lupranat® M50 from BASF SE) in the presence of n-pentane (7.5 parts by weight), dimethylcyclohexylamine and water at an isocyanate index of 116. The amounts of dimethylcyclohexylamine and water were chosen such that the fiber time was 53 seconds and the resulting foam had a density of 38 kg/m$^3$.

Comparative Example 7

Compared with the polyol component of comparative example 5 the amounts of the raw materials polyether alcohol 1 and tris-2-chloroisopropyl phosphate used were changed as follows:
61.15 parts by weight of polyether alcohol 1, and
10 parts by weight of tris-2-chloroisopropyl phosphate.
A polyol component was produced by mixing. The polyol component was cloudy at T=20° C. It was reacted with a polymeric MDI having an NCO content of 31.5 wt % (Lupranat® M50 from BASF SE) in the presence of n-pentane (7.5 parts by weight), dimethylcyclohexylamine and water at an isocyanate index of 116. The amounts of dimethylcyclohexylamine and water were chosen such that the fiber time was 53 seconds and the resulting foam had a density of 38 kg/m$^3$.

Comparative Example 8

Compared with the polyol component of comparative example 1 the amounts of polyether alcohol 1 and polyether alcohol 2 used were changed as follows:
60.65 parts by weight of polyether alcohol 1, and
0 part by weight of polyether alcohol 2.

A polyol component was produced by mixing. The polyol component is not stable at T=20° C., separating into two phases.

Inventive Example 3

Starting from 75.65 parts by weight of polyetherester polyol 1 from example 1 with a hydroxyl number of 416 mg KOH/g, based on propylene oxide and a mixture of sugar, glycerol and oleic acid as starter,
 6 parts by weight of polyether alcohol 2,
 15 parts by weight of tris-2-chloroisopropyl phosphate,
 2.0 parts by weight of silicone foam stabilizer (Tegostab® B 8443 from Goldschmidt),
 0.5 part by weight of a 50% solution of potassium acetate in ethylene glycol, and
 0.85 part by weight of water
 a polyol component was produced by mixing.

The polyol component was stable at 20° C. It was reacted with a polymeric MDI having an NCO content of 31.5 wt % (Lupranat® M50 from BASF SE) in the presence of n-pentane (7.5 parts by weight), dimethylcyclohexylamine and water at an isocyanate index of 116. The amounts of dimethylcyclohexylamine and water were chosen such that the fiber time was 53 seconds and the resulting foam had a density of 38 kg/m$^3$.

Inventive Example 4

Compared with the polyol component of inventive example 3 the amounts of polyetherester polyol 1 and water used were changed as follows:
 74.0 parts by weight of polyetherester polyol 1, and
 2.5 parts by weight of water.

A polyol component was produced by mixing. The polyol component was clear at T=20° C. It was reacted with a polymeric MDI having an NCO content of 31.5 wt % (Lupranat® M50 from BASF SE) in the presence of n-pentane (7.5 parts by weight), dimethylcyclohexylamine and water at an isocyanate index of 116. The amounts of dimethylcyclohexylamine and water were chosen such that the fiber time was 53 seconds and the resulting foam had a density of 38 kg/m$^3$.

Inventive Example 5

Compared with the polyol component of inventive example 3 the amounts of polyetherester polyol 1 and tris-2-chloroisopropyl phosphate used were changed as follows:
 80.65 parts by weight of polyetherester polyol 1, and
 10 parts by weight of tris-2-chloroisopropyl phosphate.

A polyol component was produced by mixing. The polyol component was clear at T=20° C. It was reacted with a polymeric MDI having an NCO content of 31.5 wt % (Lupranat® M50 from BASF SE) in the presence of n-pentane (7.5 parts by weight), dimethylcyclohexylamine and water at an isocyanate index of 116. The amounts of dimethylcyclohexylamine and water were chosen such that the fiber time was 53 seconds and the resulting foam had a density of 38 kg/m$^3$.

Inventive Example 6

Compared with the polyol component of inventive example 3 the amounts of polyetherester polyol 1 and polyether alcohol 2 used were changed as follows:
 81.65 parts by weight of polyetherester polyol 1, and
 0 part by weight of polyether alcohol 2.

A polyol component was produced by mixing. The polyol component was clear at T=20° C. It was reacted with a polymeric MDI having an NCO content of 31.5 wt % (Lupranat® M50 from BASF SE) in the presence of n-pentane (7.5 parts by weight), dimethylcyclohexylamine and water at an isocyanate index of 116. The amounts of dimethylcyclohexylamine and water were chosen such that the fiber time was 53 seconds and the resulting foam had a density of 38 kg/m$^3$.

Inventive Example 7

Starting from 75.65 parts by weight of polyetherester polyol 2 from example 2 with a hydroxyl number of 465 mg KOH/g, based on propylene oxide and a mixture of sugar, glycerol and oleic acid as starter,
 6 parts by weight of polyether alcohol 2,
 15 parts by weight of tris-2-chloroisopropyl phosphate,
 2.0 parts by weight of silicone foam stabilizer (Tegostab® B 8443 from Goldschmidt),
 0.5 part by weight of a 50% solution of potassium acetate in ethylene glycol, and
 0.85 part by weight of water
 a polyol component was produced by mixing.

The polyol component was stable at 20° C. It was reacted with a polymeric MDI having an NCO content of 31.5 wt % (Lupranat® M50 from BASF SE) in the presence of n-pentane (7.5 parts by weight), dimethylcyclohexylamine and water at an isocyanate index of 116. The amounts of dimethylcyclohexylamine and water were chosen such that the fiber time was 53 seconds and the resulting foam had a density of 38 kg/m$^3$.

Inventive Example 8

Compared with the polyol component of inventive example 7 the amounts of polyetherester polyol 2 and water used were changed as follows:
 74.0 parts by weight of polyetherester polyol 2, and
 2.5 parts by weight of water.

A polyol component was produced by mixing. The polyol component was clear at T=20° C. It was reacted with a polymeric MDI having an NCO content of 31.5 wt % (Lupranat® M50 from BASF SE) in the presence of n-pentane (7.5 parts by weight), dimethylcyclohexylamine and water at an isocyanate index of 116. The amounts of dimethylcyclohexylamine and water were chosen such that the fiber time was 53 seconds and the resulting foam had a density of 38 kg/m$^3$.

Inventive Example 9

Compared with the polyol component of inventive example 7 the amounts of polyetherester polyol 2 and tris-2-chloroisopropyl phosphate used were changed as follows:
 80.65 parts by weight of polyetherester polyol 2, and
 10 parts by weight of tris-2-chloroisopropyl phosphate.

A polyol component was produced by mixing. The polyol component was clear at T=20° C. It was reacted with a polymeric MDI having an NCO content of 30.9 wt % (Lupranat® M50 from BASF SE) in the presence of n-pentane (7.5 parts by weight), dimethylcyclohexylamine and water at an isocyanate index of 116. The amounts of dimethylcyclohexylamine and water were chosen such that the fiber time was 53 seconds and the resulting foam had a density of 38 kg/m$^3$.

Inventive Example 10

Compared with the polyol component of inventive example 7 the amounts of polyetherester polyol 2 and polyether alcohol 2 used were changed as follows:

81.65 parts by weight of polyetherester polyol 2, and 0 part by weight of polyether alcohol 2.

A polyol component was produced by mixing. The polyol component was clear at T=20° C. It was reacted with a polymeric MDI having an NCO content of 31.5 wt % (Lupranat® M50 from BASF SE) in the presence of n-pentane (7.5 parts by weight), dimethylcyclohexylamine and water at an isocyanate index of 116. The amounts of dimethylcyclohexylamine and water were chosen such that the fiber time was 53 seconds and the resulting foam had a density of 38 kg/m³.

Curing

Curing was determined using the bolt test. For this, at 2.5, 3, 4, 5, 6 and 7 minutes after mixing the components in a polystyrene beaker, a steel bolt with a spherical cap 10 mm in radius was pressed by a tensile/compressive tester 10 mm deep into the mushroom-shaped foam formed. The maximum force in N required here is a measure of the curing of the foam. The mean value of the maximum forces after 3, 4 and 5 minutes is reported.

Pentane Solubility

Pentane solubility was determined by incrementally adding pentane to the component to be measured for pentane solubility. Pentane was added to exactly 100 g of the in-test component according to the likely pentane solubility, and mixed therewith. If the mixture was neither cloudy nor biphasic, further pentane had to be added and mixed in again.

When the mixture was biphasic, the glass was left to stand open to the atmosphere at room temperature until the excess pentane had evaporated and the remaining solution had become clear, and then the dissolved amount of pentane was weighed back.

In the event of cloudiness, the glass was sealed and left to stand at room temperature until two phases had formed. This was followed by evaporating and weighing back.

The results of the tests are summarized in tables 1 to 4.

TABLE 1

Comparative examples 1 to 4

|  | Comparative example 1 | Comparative example 2 | Comparative example 3 | Comparative example 4 |
|---|---|---|---|---|
| Polyether 1 | 55.65 | 54 | 60.65 | 61.65 |
| Polyether 2 | 6 | 6 | 6 | 6 |
| TCPP | 15 | 15 | 10 | 15 |
| Silicone foam stabilizer | 2 | 2 | 2 | 2 |
| Castor oil | 20 | 20 | 20 | 20 |
| 50 wt % solution of potassium acetate in ethylene glycol | 0.5 | 0.5 | 0.5 | 0.5 |
| Water | 0.85 | 2.5 | 0.85 | 0.85 |
| Phase stability | Clear | Phase separation | Phase separation | Phase separation |
| Fiber time [s] | 53 |  |  |  |
| Foam density [kg/m³] | 38 |  |  |  |
| Mean curing at 3, 4, 5 min [N] | 81.1 |  |  |  |
| Viscosity [mPas] | 3300 |  |  |  |
| Pentane solubility [%] | 7 |  |  |  |

TABLE 2

Comparative examples 5 to 8

|  | Comparative example 5 | Comparative example 6 | Comparative example 7 | Comparative example 8 |
|---|---|---|---|---|
| Polyether 1 | 56.15 | 54.5 | 61.15 | 62.15 |
| Polyether 2 | 6 | 6 | 6 |  |
| TCPP | 15 | 15 | 10 | 15 |
| Silicone foam stabilizer | 1.8 | 1.8 | 1.8 | 1.8 |
| Polyether 3 | 20 | 20 | 20 | 20 |
| 50 wt % solution of potassium acetate in ethylene glycol | 0.2 | 0.2 | 0.2 | 0.2 |
| Water | 0.85 | 2.5 | 0.85 | 0.85 |
| Phase stability | Cloudy | Clear | Cloudy | Phase separation |
| Fiber time [s] | 53 | 53 |  |  |
| Foam density [kg/m³] | 38 | 38 |  |  |
| Mean curing at 3, 4, 5 min [N] | 77.3 | 74.2 |  |  |
| Viscosity [mPas] | 3000 | 2260 | 3850 |  |
| Pentane solubility [%] | 4.5 | 4.5 | 4.2 |  |

TABLE 3

Inventive examples 3 to 6

|  | Inventive example 3 | Inventive example 4 | Inventive example 5 | Inventive example 6 |
|---|---|---|---|---|
| Polyetherester polyol 1 | 75.65 | 74.0 | 80.65 | 81.65 |
| Polyether 2 | 6 | 6 | 6 |  |
| TCPP | 15 | 15 | 10 | 15 |
| Silicone foam stabilizer | 2 | 2 | 2 | 2 |
| 50 wt % solution of potassium acetate in ethylene glycol | 0.5 | 0.5 | 0.5 | 0.5 |
| Water | 0.85 | 2.5 | 0.85 | 0.85 |
| Phase stability | Clear | Clear | Clear | Clear |
| Fiber time [s] | 53 | 53 | 53 | 54 |
| Foam density [kg/m³] | 38 | 38 | 38 | 38.2 |
| Mean curing at 3, 4, 5 min [N] | 90.9 | 91.4 | 92.9 | 88.3 |
| Viscosity [mPas] | 4640 | 3950 | 4950 | 4200 |
| Pentane solubility | 20.1 | 18.5 | 19.1 | 19.0 |

Polyetherester polyol 1 from

Sugar 22.8 wt %

Glycerol 5.0 wt %

Oleic acid 15.0 wt %

PO 57.2 wt %

Hydroxyl value: 416 mgKOH/g (DIN 53240)

Viscosity (T=25° C.): 7210 mPas (DIN 53018)

TABLE 4

Inventive examples 7 to 10

|  | Inventive example 7 | Inventive example 8 | Inventive example 9 | Inventive example 10 |
|---|---|---|---|---|
| Polyetherester polyol 2 | 75.7 | 74.0 | 80.65 | 81.65 |
| Polyether 2 | 6 | 6 | 6 |  |
| TCPP | 15 | 15 | 10 | 15 |
| Silicone foam stabilizer | 2 | 2 | 2 | 2 |
| 50 wt % solution of potassium acetate in ethylene glycol | 0.5 | 0.5 | 0.5 | 0.5 |
| Water | 0.85 | 2.5 | 0.85 | 0.85 |

TABLE 4-continued

Inventive examples 7 to 10

| | Inventive example 7 | Inventive example 8 | Inventive example 9 | Inventive example 10 |
|---|---|---|---|---|
| Phase stability | Clear | Clear | Clear | Clear |
| Fiber time [s] | 53 | 53 | 53 | 54 |
| Foam density [kg/m$^3$] | 38 | 38 | 38 | 38.2 |
| Mean curing at 3, 4, 5 min [N] | 82.5 | 80.7 | 84.1 | 77.3 |
| Viscosity [mPas] | 950 | 640 | 1080 | 860 |
| Pentane solubility | 16.3 | 15.6 | 16.1 | 15 |

Polyetherester polyol 2 from
Sugar 8.46 wt %
Glycerol 19.9 wt %
Methyl oleate 13.5 wt %
PO 58.07 wt %
Hydroxyl value: 464.5 mgKOH/g (DIN 53240)
Viscosity (T=25° C.): 783 mPas (DIN 53018)

The results for the comparative examples in tables 1 and 2 show that the standard systems described are critical with regard to mixing gaps. Even minor changes in the composition lead to phase separation (comparative examples 2, 3, 4 and 8). Inventive examples 1 to 8 all have a phase-stable response to corresponding changes in the composition of the polyol components.

In addition, all inventive examples exhibit very good pentane solubilities (all>15%), which are distinctly above the pentane solubilities of the comparative examples (4.2 to 7%). High pentane solubility is relevant for many applications.

In addition, the polyetheresters used in inventive examples 3 to 6, 7 and 9 lead to improved curing. Furthermore, use of polyetherester polyol 2 (inventive examples 7 to 10) gives lower viscosities, which is advantageous for processing on certain processing machines.

We claim:

1. A rigid polyurethane foam obtained by reaction of a reactant mixture comprising:
   A) an organic or modified organic polyisocyanate;
   B) a polyetherester polyol having two or more isocyanate-reactive hydrogen atoms;
   C) optionally, a polyester polyol; and
   D) optionally, a polyetherol polyol; in the presence of
   E) optionally, a flame retardant,
   F) a blowing agent, and
   G) a catalyst, wherein
   the polyetherester polyol B) is a reaction product of components, comprising:
   a1) 15 to 40 wt % of water or a polyol or a polyamine, the polyol or polyamine having an average functionality of 2.5 to 8,
   a2) 2 to 30 wt % of a fatty acid or fatty acid monoester, and
   a3) 50 to 70 wt % of an alkylene oxide having 2 to 4 carbon atoms,
   wherein the polyetherester polyol B) is obtained by initially preparing a mixture comprising a1) the water, the polyol or the polyamine and a2) the fatty acid or the fatty acid monoester in a reactor, inertizing the reactor and adding a3) the alkylene oxide to the inertized reactor.

2. The rigid polyurethane foam according to claim 1 wherein the component a1) comprises at least one selected from the group consisting of a sugar, pentaerythritol, sorbitol, trimethylolpropane, glycerol, tolylenediamine, ethylenediamine, ethylene glycol, propylene glycol and water.

3. The rigid polyurethane foam according to claim 2 wherein component a1) comprises glycerol and sucrose.

4. The rigid polyurethane foam according to claim 2 wherein component a2) comprises oleic acid or an oleic acid derivative.

5. The rigid polyurethane foam according to claim 1 wherein component a3) is propylene oxide.

6. The rigid polyurethane foam according to claim 1 wherein an OH number of the polyetherester polyol B) is from 200 to 700 mg KOH/g.

7. The rigid polyurethane foam according to claim 1 wherein a functionality of the polyetherester polyol B) is from 2.5 to 8.

8. The rigid polyurethane foam according to claim 1 wherein the polyether polyol D) is present and the polyether polyol is a propoxylated ethylenediamine.

9. The rigid polyurethane foam according to claim 1 wherein the polyether polyol D) is present and the polyether polyol is a propoxylated polyol of a mixture of glycerol and sucrose.

10. A process for producing the rigid polyurethane foam of claim 1, the process comprising:
    reacting the organic or modified organic polyisocyanate A) with the polyetherester polyol B) and optionally the polyester polyol C), and optionally, the polyetherol polyol D);
    wherein
    the reaction is conducted in the presence of the blowing agent F), and the catalyst G).

11. A polyol mixture comprising: a polyetherester polyol B);
    optionally, a polyester polyol C);
    optionally, a polyetherol polyol D);
    a blowing agent F);
    a catalyst G); and
    optionally, a flame retardant E);
    wherein
    the polyetherester polyol B) is a reaction product of components, comprising:
    a1) 15 to 40 wt % of water or a polyol or a polyamine, the polyol or polyamine having an average functionality of 2 to 8,
    a2) 2 to 30 wt % of a fatty acid or fatty acid monoester, and
    a3) 50 to 70 wt % of an alkylene oxides having 2 to 4 carbon atoms,
    wherein the polyetherester polyol B) is obtained by initially preparing a mixture comprising a1) the water, the polyol or the polyamine and a2) the fatty acid or the fatty acid monoester in a reactor, inertizing the reactor and adding a3) the alkylene oxide to the inertized reactor.

12. The polyol mixture according to claim 11, comprising:
    25 to 90 wt % of the polyetherester polyol B);
    0 to 20 wt % of the polyester polyol C);
    0 to 35 wt % of the polyether polyol D);
    0 to 30 wt % of the flame retardant E);
    1 to 40 wt % of the blowing agent F);
    0.001 to 5 wt % of catalysts the catalyst G).

13. The rigid polyurethane foam of claim 1, wherein the reaction mixture further comprises an auxiliary or additive H), that is selected from the group consisting of a surface-active substance, a foam stabilizer, a cell regulator, a filler, a dye, a pigment, a hydrolysis inhibitor, a fungistatic substance and a bacteriostatic substance.

14. The process for producing a polyurethane foam of claim 10, wherein the reaction mixture further comprises an auxiliary or additive H), that is selected from the group consisting of a surface-active substance, a foam stabilizer, a cell regulator, a filler, a dye, a pigment, a hydrolysis inhibitor, a fungistatic substance and a bacteriostatic substance.

15. The polyol mixture of claim 11, further comprising an auxiliary or additive H), that is selected from the group consisting of a surface-active substance, a foam stabilizer, a cell regulator, a filler, a dye, a pigment, a hydrolysis inhibitor, a fungistatic substance and a bacteriostatic substance.

16. The rigid polyurethane foam of claim 1, wherein component a2) consists of a fatty acid monoester.

17. The rigid polyurethane foam of claim 1, wherein component a2) is biodiesel.

18. The rigid polyurethane foam of claim 16, wherein component a2) is methyl oleate.

19. The rigid polyurethane foam of claim 1, wherein the polyetherester polyol B) is a reaction product of components, consisting of:
   a1) 15 to 40 wt % of water or a polyol or a polyamine, the polyol or polyamine having an average functionality of 2.5 to 8,
   a2) 2 to 30 wt % of a fatty acid or fatty acid monoester, and
   a3) 50 to 70 wt % of an alkylene oxide having 2 to 4 carbon atoms,
   wherein the polyetherester polyol B) is obtained by initially preparing a mixture comprising a1) the water, the polyol or the polyamine and a2) the fatty acid or the fatty acid monoester in a reactor, inertizing the reactor and adding a3) the alkylene oxide to the inertized reactor.

* * * * *